US00RE34877E

United States Patent [19]

Bach et al.

[11] E Patent Number: Re. 34,877

[45] Reissued Date of Patent: Mar. 14, 1995

[54] AZO DYES FOR THERMOTRANSFER PRINTING

[75] Inventors: Volker Bach, Neustadt; Karl-Heinz Etzbach, Frankenthal; Sabine Gruettner, Mutterstadt; Gunther Lamm, Hassloch; Helmut Reichelt, Neustadt; Ruediger Sens, Mannheim, all of Germany

[73] Assignee: BASF Aktiengesellschaft, Ludwigshafen, Germany

[21] Appl. No.: 166,103

[22] Filed: Dec. 14, 1993

Related U.S. Patent Documents

Reissue of:

[64] Patent No.: 5,158,928
Issued: Oct. 27, 1992
Appl. No.: 652,771
Filed: Feb. 8, 1991

[30] Foreign Application Priority Data

Feb. 8, 1990 [DE] Germany ..... 4003780

[51] Int. Cl.[6] ..... B41M 5/035; B41M 5/38

[52] U.S. Cl. ..... 503/227; 428/195; 428/913; 428/914

[58] Field of Search ..... 8/471; 428/195, 913, 428/914; 503/227

[56] References Cited

U.S. PATENT DOCUMENTS

| | | | |
|---|---|---|---|
| 4,933,226 | 6/1990 | Evans et al. | 428/195 |
| 5,101,035 | 3/1992 | Bach et al. | 503/227 |

FOREIGN PATENT DOCUMENTS

| | | | |
|---|---|---|---|
| 0192435 | 8/1986 | European Pat. Off. | 503/227 |
| 275381 | 7/1988 | European Pat. Off. | 503/227 |
| 239291 | 11/1985 | Japan | 503/227 |

OTHER PUBLICATIONS

Derwent Japanese Patents Report, vol. 79, No. 46, 14 Dec. 1979, London, GB, Seite 2 Canon K.K.: "Heat--Sensitive Sheet for Latent Image Production".

Patent Abstracts of Japan, vol. 10, No. 109 (M-472) (2166), 23 Apr. 1986.

*Primary Examiner*—B. Hamilton Hess

*Attorney, Agent, or Firm*—Oblon, Spivak, McClelland, Maier, & Neustadt

[57] ABSTRACT

Azo dyes useful for thermotransfer printing have the formula

I

3 Claims, No Drawings

AZO DYES FOR THERMOTRANSFER PRINTING

Matter enclosed in heavy brackets [ ] appears in the original patent but forms no part of this reissue specification; matter printed in italics indicates the additions made by reissue.

The present invention relates to the use in thermotransfer printing of azo dyes of the formula I

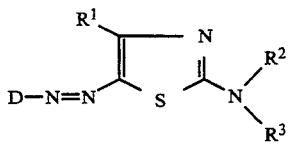

I where the substituents have the following meaning:

$R^1$ is hydrogen;

$C_1$–$C_{15}$-alkyl which may be substituted by phenyl or phenoxy;

cyclohexyl which may be substituted by $C_1$–$C_5$-alkyl, $C_1$–$C_5$-alkoxy or halogen:

phenyl which may be substituted by $C_1$–$C_5$-alkyl, $C_1$–$C_5$-alkoxy, sulfonamido or halogen;

thienyl which may be $C_1$–$C_5$-alkyl- or halogen-substituted, furanyl or pyridyl;

a radical of the formula II $$[-W-O]_n-R^4 \qquad \text{II}$$

where

W is identical or different $C_2$–$C_6$-alkylene, n is from 1 to 6 and $R^4$ is $C_1$–$C_4$-alkyl or a phenyl or benzyl group which may both be substituted by $C_1$–$C_4$-alkyl or $C_1$–$C_4$-alkoxy;

$R^2$ and $R^3$ are each hydrogen;

alkyl, alkoxy, alkoxyalkyl, alkanoyloxyalkyl, alkoxycarbonyloxyalkyl, alkoxycarbonylalkyl, haloalkyl, hydroxyalkyl or cyanoalkyl, which may each contain up to 15 carbon atoms and be substituted by phenyl, $C_1$–$C_4$-alkylphenyl, $C_1$–$C_4$-alkoxyphenyl, halophenyl, benzyloxy, $C_1$–$C_4$-alkylbenzyloxy, $C_1$–$C_4$-alkoxybenzyloxy, halogenzyloxy, halogen, hydroxyl or by cyano; cyclohexyl which may be substituted by $C_1$14 $C_{15}$-alkyl, $C_1$–$C_{15}$-alkoxy or halogen;

phenyl which may be substituted by $C_1$–$C_{15}$-alkyl, $C_1$–$C_{15}$-alkoxy, benzyloxy or halogen; a radical of the abovementioned formula II; and is the radical of a diazo component III $$D-NH_2 \qquad \text{III}$$

and specifically to a process for transferring these azo dyes by diffusion from a transfer to a plastic-coated substrate with the aid of a thermal printing head.

The technique of thermotransfer printing is common knowledge; suitable heat sources besides lasers and IR lamps are in particular thermal printing heads capable of emitting short heat pulses lasting fractions of a second.

In this preferred embodiment of thermotransfer printing, a transfer sheet which contains the transfer dye together with one or more binders, a support material and possibly further assistants such as release agents or crystallization inhibitors is heated from the back with the thermal printing head, causing the dye to migrate out of the transfer sheet and to diffuse into the surface coating of the substrate, for example into the plastic coat of a coated sheet of paper.

The essential advantage of this process is that the amount of dye to be transferred (and hence the color gradation) can be controlled in a specific manner via the amount of energy supplied to the thermal printing head.

Thermal transfer printing is in general carried out using the three subtractive primaries yellow, magenta and cyan (with or without black), and the dyes used must have the following properties to ensure optimal color recording: ready thermal transferability, little tendency to migrate within or out of the surface coating of the receiving medium at room temperature, high thermal and photochemical stability, and also resistance to moisture and chemicals, no tendency to crystallize on storage of the transfer sheet, a suitable hue for subtractive color the transfer sheet, a suitable hue for subtractive color mixing, a high molar absorption coefficient, and ready industrial availability.

It is very difficult to meet all these requirements at one and the same time. In particular, the magenta dyes used to date have not been fully satisfactory. This is also true for example of the azo dyes described, and recommended for thermal transfer, in U.S. Pat. No. 4,764,178, which resemble the azo dyes I and have coupling components based on aniline, tetrahydroquinoline, aminoquinoline or julolidine.

The azo dyes I themselves are known per se or obtainable by known methods, for example as described in earlier German Patent Application P 38 33 443.7, O. Annen et al., Rev. Prog. Coloration 17 (1987), 72–85, or M. A. Weaver and L. Shuttleworth, Dyes and Pigments 3 (1982), 81–121.

It is an object of the present invention to find suitable red and blue dyes for thermotransfer printing which come closer to the required property profile than the prior art dyes.

We have found that this object is achieved by the azo dyes I defined at the beginning.

We have also found a process for transferring azo dyes by diffusion from a transfer to a plastic-coated substrate with the aid of a thermal printing head, which comprises using for this purpose a transfer on which are situated one or more of the azo dyes I defined at the beginning.

We have further found preferred embodiments of this process, which comprise using dyes of the formula Ia

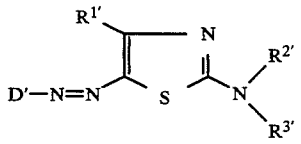

Ia where the substituents have the following meanings:

$R^{1'}$ is $C_1$–$C_8$-alkyl which may be substituted by phenyl or cyclohexyl;

phenyl which may be substituted by $C_1$–$C_4$-alkyl, $C_1$–$C_4$-alkoxy or chlorine;

thienyl;

a radical of the formula IIa $$[-(CH_2)_3-O]_p-[(CH_2)_2-O]_q-R^{31} \quad \text{IIa}$$

where p is 0 or 1, q is from 1 to 4, and $R^{4'}$ is $C_1$–$C_4$-alkyl, phenyl or benzyl;

$R^{2'}$ and $R^{3'}$ are each $C_1$–$C_{12}$-alkyl, $C_1$–$C_{10}$-alkoxy or $C_1$–$C_{10}$-cyanoalkyl or a radical of the abovementioned formula IIa; and D' is the radical of a diazo compound III of the aniline, phenylazoaniline, aminothiophene, phenylazoaminothiophene, aminothazole, phenylazoaminothiazole, aminoisothiazole, aminobenzisothiazole, aminothiadiazole, aminoisothiadiazole, aminooxazole, aminooxadiazole, aminodiazole, aminotriazole or aminopyrrole series.

Preferred diazo components III are:

aniline derivatives of the formula IIIa

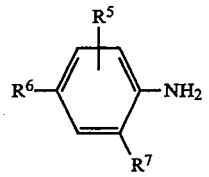

IIIa phenylazoaniline derivatives of the formula IIIb

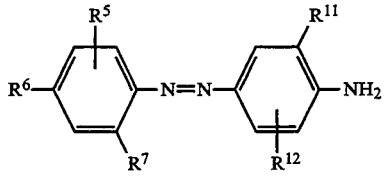

IIIb aminothiphene derivatives of the formula IIIc

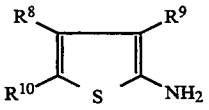

IIIc phenylazoaminothiophene derivatives of the formula IIId

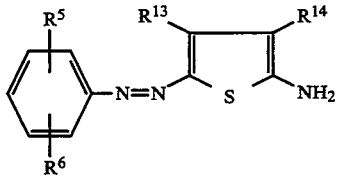

IIId

Aminothiazole derivatives of the formula IIIe

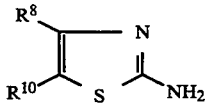

IIIe phenylazoaminothiazole derivatives of the formula IIIf

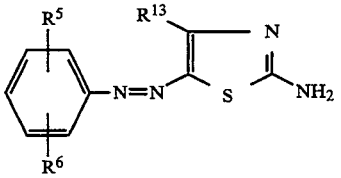

IIIf aminoisothiazole derivatives of the formula IIIg

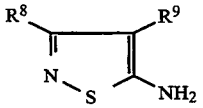

IIIg aminobenzisothiazole derivatives of the formulae IIIh and IIIi

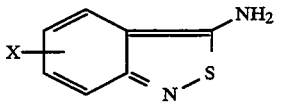

IIIh

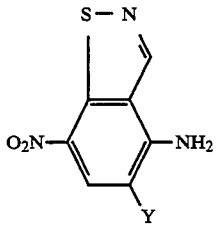

IIj aminothiadiazole derivatives of the formula IIIk

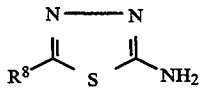

IIIk aminothiadiazole derivatives of the formula IIIl

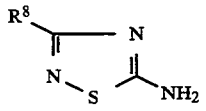

IIIl aminopyrrole derivatives of the formula IIIm

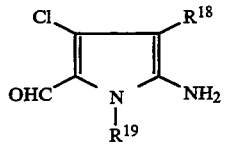

IIIm

Here the substituents have the following meanings:

$R^5$, $R^6$ and $R^7$ are each hydrogen, chlorine, bromine, nitro or cyano; alkyl alkoxyalkyl, alkanoyloxalkyl or alkoxycarbonylalkyl, which may each contain up to 10 carbon atoms;

a radical of the formula II;

a radical of the formula $-CO-OR^{15}$, $-CO-NR^{15}R^{16}$, $-SO-OR^{15}$, $-SO_2-OR^{15}$ or $-SO_2-NR^{15}R^{16}$ in which $R^{15}$ and $R^{16}$ are each alkyl or alkoxyalkyl which may each contain up to 10 carbon atoms, and $R^{16}$ may also be hydrogen;

$R^5$ may also be oxadiazole substituted in the 3-position by $C_1$–$C_8$ -alkoxy;

$R^6$ may also be a radical of the formula —CO—$R^{17}$ or —CO—$OR^{17}$ where $R^{17}$ is phenyl which may be substituted by $C_1$–$C_8$-alkyl;

a radical of the formula IV

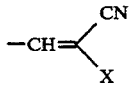

IV where

X is cyano, —CO—$OR^{15}$ or —CO—$NR^{15}R^{16}$;

$R^8$ is hydrogen, chlorine, cyano or thiocyanato, alkyl, alkoxy, alkylthio or alkoxyalkyl which may each contain up to 10 carbon atoms; 2-($C_1$–$C_2$-alkoxycarbonyl-)ethylthio; 2-(pyrrolid-1-yl)ethyl; $C_5$–$C_6$-cycloalkyl or -cycloalkylthio; phenyl which may be substituted by $C_1$–$C_4$-alkyl, $C_1$–$C_4$-alkoxy, benzyloxy or phenylthio; Ar-$C_1$–$C_4$-alkythio; Ar-$C_1$–$C_4$-alkoxy or Ar-$C_1$–$C_4$-alkylthio;

thienyl or pyridyl which may each be substituted by $C_1$–$C_4$-alkyl;

a radical of the formula II;

a radical of the formula —CO—$OR^{15}$, —CO—$NR^{15}R^{16}$, —SO—$OR^{15}$ or —$SO_2$—$OR^{15}$;

$R^9$ is hydrogen, chlorine, bromine, nitro, cyano, thiocyanato or phenyl; or a radical of the formula —CO—$OR^{15}$ or —CO—$NR^{15}R^{16}$;

$R^{10}$ is hydrogen, chlorine, bromine, nitro, cyano or formyl; a radical of the formula —CO—$OR^{15}$ or —CO—$NR^{15}R^{16}$; or a radical of the formula IV $R^{11}$ and $R^{12}$ are each hydrogen, chlorine, bromine, nitro or cyano; $C_1$–$C_4$-alkyl or $C_1$–$C_4$-alkoxy; or a radical of the formula —CO—$OR^{15}$ or —CO—$NR^{15}R^{16}$;

$R^{13}$ is hydrogen, chlorine, bromine or $C_1$–$C_4$-alkyl;

$R^{14}$ is hydrogen or cyano; or a radical of the formula —CO—$OR^{15}$ or —CO—$NR^{15}R^{16}$;

$R^{18}$ is cyano or formamido;

$R^{19}$ is methyl or phenyl;

X is hydrogen, chlorine or nitro; and

Y is hydrogen or cyano.

Suitable alkyl $R^1$, $R^2$, $R^3$, $R^4$, $R^5$, $R^6$, $R^7$, $R^8$, $R^{11}$, $R^{12}$, $R^{13}$, $R^{15}$ or $R^{16}$ is in particular methyl, ethyl, propyl, ispropyl or butyl, but also isobutyl, sec.-butyl or tert.-butyl.

$R^1$, $R^2$, $R^3$, $R^5$, $R^6$, $R^7$, $R^8$, $R^{15}$ *and* $R^{16}$ may each also be for example pentyl, isopentyl, neopentyl, tert.-pentyl, hexyl, 2-methylpentyl, heptyl, octyl, 2-ethylhexyl, mixed isooctyl isomer and cyclohexyl.

$R^1$, $R^2$, $R^3$, $R^5$, $R^6$, $R^7$, $R^8$, $R^{15}$ and $R^{16}$ may each also be for example nonyl, decyl, mixed isononyl isomer or mixed isodecyl isomer.

Other possible meanings for $R^1$, $R^2$ and $R^3$ include undecyl, dodecyl, tridecyl, mixed isotridecyl isomer, tetradecyl and pentadecyl and for $R^2$ and $R^3$ additionally hexadecyl, heptadecyl, octadecyl, nonadecyl and eicosyl.

Alkyls $R^2$ and $R^3$ may each also be substituted by phenyl; specific examples, where Ph=phenyl, are:

—$CH_2$—Ph, —CH($CH_3$)—Ph, —$(CH_2)_2$—Ph,
—$(CH_2)_4$—CH($CH_3$)—Ph—3—$CH_3$,
—$(CH_2)_3$—CH($C_4H_9$)—Ph—3—$CH_3$,
—$(CH_2)_6$—Ph—4—O—$CH_3$.
—CH($C_2H_5$)—$(CH_2)_3$—Ph—3—O—$C_2H_5$ and
—CH($C_2H_5$)—$(CH_2)_3$—Ph—3—Cl.

It is also possible to use for example the following halo, hydroxyl and cyanoalkyl groups as $R^2$ or $R^3$:

—$(CH_2)_5$—Cl, —CH($C_4H_9$)—$(CH_2)_3$—Cl or —$(CH_2)_4$—$CF_3$;
—$(CH_2)_2$—CH($CH_3$)—OH. —$(CH_2)_2$—CH($C_4H_9$)—OH oder CH($C_2H_5$)—$(CH_2)_9$—OH:
—$(CH_2)_2$—CN, —$(CH_2)_3$—CN, —$CH_2$—CH($CH_3$)—CH($C_2H_5$)—CN, —$(CH_2)_6$—CH($C_2H_6$)—CN and
—$(CH_2)_3$—CH($CH_3$)—$(CH_2)_2$—CH($CH_3$)—CN.

When $R^1$, $R^2$, $R^3$, $R^5$, $R^6$, $R^7$, $R^{15}$ or $R^{16}$ is alkoxyalkyl of preferred formula II, suitable W is for example 1,2- and 1,3-propylene, 1,2-, 1,3-, 1,4- and 2,3-butylene, pentamethylene, hexamethylene and 2-methylpentamethylene, but in particular ethylene, and $R^4$ is in particular methyl, ethyl, propyl, butyl and also benzyl and phenyl which may each be substituted by methyl(oxy), ethyl(oxy), propyl(oxy) or butyl(oxy). Particularly preferred II is for example:

—$(CH_2)_2$—O—$CH_3$, —$(CH_2)_2$—O—$C_2H_5$, —$(CH_2)_2$—O—$C_3H_7$, —$(CH_2)_2$—O—$C_4H_9$,
—$(CH_2)_2$—O—$CH_2$—CH($CH_3$)—$CH_3$,
—$(CH_2)_2$—O—Ph, —$(CH_2)_2$—O—$CH_2$—Ph,
—$[(CH_2)_2$—O$]_2$—$CH_3$, —$[(CH_2)_2$—O$]_2$—$C_2H_5$, —$[(CH_2)_2$—O$]_2$—Ph,
—$[(CH_2)_2$—O$]_2$—Ph—4—O—$C_4H_9$,
—$[(CH_2)_2$—O$]_3$—$C_4H_9$, —$[(CH_2)_2$—O$]_3$—Ph, —$[(CH_2)_2$—O$]_3$—Ph—3—$C_4H_9$,
—$[(CH_2)_2$—O$]_4$—$CH_3$,
—$(CH_2)_3$—O—$(CH_2)_2$—O—$CH_3$, —$(CH_2)_3$—O—$(CH_2)_2$—O—$C_2H_5$,
—$(CH_2)_3$—O—$(CH_2)_2$—O—Ph, —$(CH_2)_3$—O—$[(CH_2)_2$—O$]_2$—$CH_3$ and
—$(CH_2)_3$—O—$[(CH_2)_2$—O$]_2$—$C_2H_5$.

Further preferred groups II are for example:

—$(CH_2)_3$—O—$CH_3$, —$(CH_2)_3$—O—$C_2H_5$, —$(CH_2)_3$—O—$C_3H_7$, —$(CH_2)_3$—O—$C_4H_9$,
—$(CH_2)_3$—O—Ph, —$[(CH_2)_3$—O$]_2$—$CH_3$, —$[(CH_2)_3$—O—$]_2$'$C_2H_5$,
—$CH_2$—CH($CH_3$)—O—$CH_3$, —$CH_2$—CH($CH_3$)—O—$C_2H_5$, —$CH_2$—CH($CH_3$)—O—$C_3H_7$,
—$CH_2$—CH($CH_3$)—O—$C_4H_9$, —$CH_2$—CH($CH_3$)—O—Ph,
—$(CH_2)_4$—O—$CXH_3$, —$(CH_2)_4$—O—$C_2H_5$, —$(CH_2)_4$—O—$C_4H_9$,
—$(CH_2)_4$—O—$CH_2$—CH($C_2H_5$)—$C_4H_9$, —$(CH_2)_4$—O—Ph,
—$(CH_2)_4$—O—$CH_2$—Ph—2—O—$C_2H_5$, —$(CH_2)_4$—O—$C_6H_{10}$—2—$C_2H_5$,
—$[(CH_2)_4$—O$]_2$—$CH_3$, —$[(CH_2)_4$—O$]_2$—$C_2H_5$, —$[(CH_2)_2$—CH($CH_3$)—O$]_2$—$C_2H_5$,
—$(CH_2)_5$—O—$CH_3$, —$(CH_2)_5$—O—$C_2H_5$, —$(CH_2)_5$—O—$C_3H_7$, —$(CH_2)_5$—O—Ph,
—$CH_2)_2$—CH($C_2H_5$)—O—$CH_2$—Ph—3—O—$C_4H_9$, —$(CH_2)_2$—CH($C_2H_5$)—O—$CH_2$—Ph—3—Cl,
—$(CH_2)_6$—O—$C_4H_9$, —$(CH_2)_6$—O—Ph—4—O—$C_4H_9$, —$(CH_2)_3$—CH($CH_3$)—CH($CH_3$)—$CH_2$—O—$C_4H_9$,
—$(CH_2)_3$—O—$(CH_2)_4$—O—$CH_3$, —$(CH_2)_3$—O—$(CH_2)_4$—O—$C_2H_5$,
—$(CH_2)_4$—O—$(CH_2)_3$—O—$CH_3$ and —$(CH_2)_4$—O—$(CH_2)_3$—O—$C_2H_5$.

Suitable alkoxyalkyl also includes for example:

—$(CH_2)_8$—O—$CH_3$, —$(CH_2)_8$—O—$C_4H_9$, —$(CH_2)_8$—O—$CH_2$—Ph—3—$C_2H_5$,

—$(CH_2)_4$—CH(Cl)—$(CH_2)_3$—O—$CH_2$—Ph—3—$CH_3$ and

—$(CH_2)_3$—CH($C_4H_9$)—O—$CH_2$—Ph—3—$CH_3$.

Of the above-recited alkoxyalkyl groups, those which contain up to 8 carbon atoms are also suitable for use as $R^8$ and those having up to 12 carbon atoms are also suitable for use as $R^{15}$ and $R^{16}$.

Preferred alkoxy $R^2$, $R^3$, $R^8$, $R^{11}$ or $R^{12}$ is for example methoxy, ethoxy, propoxy, isopropoxy, butoxy, isobutoxy or sec.-butoxy.

$R^8$ and especially $R^2$ and $R^3$ may each also be for example pentyloxy, isopentyloxy, neopentyloxy, hexyloxy, oxtyloxy or 2-ethylhexyloxy.

$R^2$ and $R^3$ may each in addition be for example nonyloxy or decyloxy but also undecyloxy, dodecyloxy, tridecyloxy, tetradecyioxy or pentadecyloxy.

$R^8$ may also be alkylthio, such as preferably methylthio, ethylthio or 2-cyanoethylthio, but also propylthio, isopropylthio, butylthio, pentylthio, hexylthio, heptythio, octylthio, 2-ethylhexylthio, 2-ethoxycarbonylethylthio or in particular 2-methoxycarbonylthio.

Suitable alkanoyloxyalkyl, alkoxycarbonyloxyalkyl or alkoxycarbonylalkyl $R^2$ or $R^3$ is for example:

—$CH_2)_2$—O—CO—$CXH_3$,

—$(CH_2)_3$—O—CO—$(CH_2)_7$—$CH_3$,

—$(CH_2)_2$—O—CO—$(CH_2)_3$—PH-2—O—$CH_3$,

—CH($CH_2$—Ph—3—$CH_3$)—O—CO—$C_4H_9$ and

—$(CH_2)_4$—O—CO—$(CH_2)_4$—CH($C_2H_5$)—OH;

—$(CH_2)_2$—O—CO—O—$CH_3$,

—$(CH_2)_3$—O—CO—O—$(CH_2))_7$—$CH_3$,

—CH($C_2H_5$)—$CH_2$—O—CO—O—$C_4H_9$,

—$(CH_2)_4$—O—CO—O—$(CH_2)_2$—CH($CH_3$)—O—Ph—3—$CH_3$ and

—$(CH_2)_5$—O—CO—O—$(CH_2)_5$—CN;

—$(CH_2)_2$—CO—O—$CH_3$,

—$(CH_2)_3$—CO—O—$C_4H_9$,

—$(CH_2)_3$—CH($CH_3$)—$CH_2$—CO—O—$C_4H_9$,

—$(CH_2)_3$—CH($C_4H_9$)—$CH_2$—CO—O—$C_2H_5$,

—$(CH_2)_2$—CO—O—$(CH_2)_5$—Ph,

—$(CH_2)_4$—CO—O—$(CH_2)_4$—Ph-4$C_4H_9$,

—$(CH_2)_3$—CO—O—$(CH_2)_4$—O—Ph-3—O—$CH_3$,

—$(CH_2)_2$—CH($CH_2$OH)—$(CH_2)_2$—CO—O—$C_2H_5$,

—CH($C_2H_5$)—$CH_2$—CO—O—$CH_2)_4$—OH and

—$(CH_2)_3$—CO—O—$(CH_2)_6$—CN.

Phenyl and cyclohexyl which may each be present as $R^1$, $R^2$ or $R^3$ are for example: —Ph, —Ph—3—$CH_3$, —Ph—4—$(CH_2)_{10}$—$CH_3$, —Ph—3—$(CH_2)_5$—CH($CH_3$)—$CH_3$, Ph—4—O—$C_4H_9$, —Ph—4—$(CH_2)_5$—CH($C_2H_5$)—$CH_3$, —Ph—4—)—$CH_2$—Ph or —Ph—4—Cl and also in the case of $R^1$ in particular —Ph—3—$SO_2$—N($CH_3$)—$CH_3$ or Ph—3—$SO_2$—N—($(CH_2)_2$—O—$CH_3$)—$(CH_2)_2$—O—$CH_3$; —$C_6H_{10}$—4—$CH_3$, —$C_6H_{10}$—4—$C_{10}H_{21}$, —$C_6H_{10}$—3—O—$C_4H_9$, —$C_6H_{10}$—3—O—$(CH_2)_4$—CH($C_2H_5$)—$CH_3$ or —$C_6H_{10}$—4—Cl.

Where $R^5$, $R^6$, $R^7$, $R^8$, $R^9$, $R^{10}$, $R^{11}$, $R^{12}$ or $R^{14}$ is a group of the formula —CO—$OR^{15}$ or —CO—$NR^{15}R^{16}$, particularly suitable instanccs thereof are —CO—O—$CH^3$, —CO—O—$C_2H_5$, —CO—O—$C_3H_7$, —CO—O—$C_4H_9$, —CO—N($CH_3$)—$CH_3$ and —CO—N($C_2H_5$)—$C_2H_5$, but also for example —CO—O—$C_5H_{11}$, —CO—O—$C_6H_{13}$, —CO—n($C_3H_7$)—$C_3H_7$ and —CO—n($C_4H_9$.

Groups of the formula —SO—$OR^{15}$ or —$SO_2$—$OR^{15}$, which may each be used as $R^5$, $R^6$, $R^7$ or $R^8$ are For example:

—SO—O—$CH_3$, —SO—O—$C_2H_5$, —SO—O—$C_3H_7$, —$SO_2$—O—$CH_3$, —$SO_2$—O—$C_2H_5$, —$SO_2$—O—$C_3H_7$.

$R^5$, $R^6$ and $R^7$ may each also be groups of the formula —$SO_2$—$NR^{15}R^{16}$, in particular —$SO_2$—N($CH_3$)—$CH_3$, —$SO_2$—N($(CH_2)_2$—O—$CH_3$)—$(CH_2)_2$—O—$CH_3$, but also for example —$SO_2$—N($C_2H_5$)—$C_2H_5$ or —$SO_2$—N($C_3H_7$)—$C_3H_7$.

$R^6$ and $R^{10}$ may each also be groups of the formula IV, such as —CH=C(CN)—CN, —CH=C(CN)—CO—O—$CH_3$, —CH=C(CN)—CO—O—$C_2H_5$. —CH=C(CN)—CO—O—$C_3H_7$, —CH=—C(CN)—CO—O—$C_4H_9$, —CH=C(CN)—N($CH_3$)—$CH_3$ or —CH=C(CN)—N($C_2H_5$)—$C_2H_5$.

Of the aforementioned radicals, $R^1$ is particularly preferably $C_1$–$C_8$alkyl, especially methyl or isopropyl, cyclohexyl, phenyl, which may also be methoxy-, sulfonamido- or chlorine-substituted, or benzyl. Preferred $R^{12}$ further includes 3-thienyl and especially 2-thienyl. 3-furanyl and especially 2-furanyl, and also 2-pyridyl, 4-pyridyl and especially 3-pyridyl.

Preferred alkyl $R^2$ or $R^3$ is of up to 12 carbon atoms, especially methyl, ethyl or propyl, preferred cyanoalkyl and alkoxy $R^2$ or $R^3$ is of up to 10 carbon atoms. Particularly preferred $R^2$ and $R^3$ each has the formula Ila with methyl or ethyl as $R^{4'}$.

Of the above-recited diazo components D-$NH_2$, the following are particularly preferred:

aniline derivatives IIIa having the above-defined meanings of $R^5$, $R^6$ and $R^7$ aminothiophene derivatives IIIc having the following meanings for $R^8$, $R^9$ and $R^{10}$:

$R^8$ is hydrogen or chlorine; alkyl, alkoxy or alkoxyalkyl, which may each contain up to 8 carbon atoms; phenyl which may be $C_1$–$C_4$-alkyl- or $C_1$–$C_4$-alkoxy-substituted, or benzyl; or a radical of the formula —CO—$OR^{15}$;

$R^9$ is cyano or a radical of the formula —CO—$OR^{15}$ or else —CO—$NR^{15}R^{16}$; and $R^{10}$ is cyano, nitro, formyl or a radical of the formula IV aminothiazole derivatives IIIe having the following meanings for $R^8$ and $R^{10}$:

$R^8$ is hydrogen, chlorine, $C_1$14 $C_8$-alkyl, phenyl which may be $C_1$–$C_4$-alkyl- or $C_1$–$C_4$-alkoxy-substituted, benzyl, or a radical of the formula —CO—$OR^{15}$; and $R^{10}$ is cyano, nitro, formyl or a radical of the formula —CO—$OR^{15}$ aminoisothiazole derivatives IIIg having the following meanings for $R^8$ and $R^9$:

$R^8$ is chlorine, alkyl, alkoxy, alkylthio or alkoxyalkyl which may each contain up to 8 carbon atoms, phenyl which may be $C_1$–$C_4$-alkyl- or $C_1$–$C_4$-alkoxy-substituted, benzyl or benzyloxy, and $R^9$ is cyano, nitro or a radical of the formula —CO—$OR^{15}$ aminothiadiazole derivatives IIIk and aminoisothiadiazole derivatives IIIl having the following meaning for $R^8$:

$R^8$ is hydrogen, chlorine, cyano, thiocyanato, or alkyl, alkoxy, alkylthio or alkoxyalkyl, which may each contain up to 8 carbon atoms, 2-($C_1$–$C_2$-alkoxycarbonyl)ethylthio, phenyl which may be $C_1$–$C_4$-alkyl- or $C_1$–$C_4$-alkoxy-substituted, benzyl, benzyloxy, or a radical of the formula —CO—$OR^{15}$, —SO—$OR^{15}$ or —$SO_2$—$OR^{15}$.

The dyes I to be used according to the present invention are notable for the following properties compared with prior art red and blue thermotransfer printing dyes having aniline-based coupling components: readier thermal transferability, improved migration properties in the receiving medium at room temperature, higher thermal stability, higher lightfastness, better resistance to moisture and chemicals. better solubility in printing ink preparation, higher color strength. and readier industrial accessability.

In addition, the azo dyes I exhibit a distinctly better purity of hue, in particular in mixtures of dyes, and produce improved black prints.

The transfer sheets required as dye donors for the thermotransfer printing process according to the present invention are prepared as follows. The azo dyes I are incorporated in an organic solvent, such as isobutanol, methyl ethyl ketone, methylene chloride, chlorobenzene, toluene, tetrahydrofuran or a mixture thereof, together with one or more binders and possibly further assistants such as release agents or crystallization inhibitors to form a printing ink in which the dyes are preferably present in a molecularly dispersed, i.e. dissolved, form. The printing ink is then applied to an inert support and dried.

Suitable binders for the use of the azo dyes I according to the present invention are all materials which are soluble in organic solvents and which are known to be suitable for thermotransfer printing, e.g. cellulose derivatives such as methylcellulose, hydroxypropylcellulose, cellulose acetate or cellulose acetobutyrate, but in particular ethylcellulose and ethylhydroxyethylcellulose, starch, alginates, alkyd resins and vinyl resins such as polyvinyl alcohol or polyvinylpyrrolidone but in particular polyvinyl acetate and polyvinyl butyrate. It is also possible to use polymers and copolymers of acrylates and derivatives thereof, such as polyacrylic acid, polymethyl methacrylate or styrene/acrylate copolymers, polyester resins, polyamide resins, polyurethane resins or natural resins such as gum arabic.

It is frequently advisable to use mixtures of these binders, for example mixtures of ethylcellulose and polyvinyl butyrate in a weight ratio of 2:1.

The weight ratio of binder to dye is in general from 8:1 to 1:1, preferably from 5:1 to 2:1.

Suitable assistants are for example release agents based on perfiuofinated alkylsulfonamidoalkyl esters or silicones as described in EP-A-127,092 and EP-A-192,435, and in particular organic additives which stop the transfer dyes from crystallizing out in the course of storage or heating of the inked ribbon, for example cholesterol or vanillin.

Inert support materials are for example tissue, blotting or parchment paper and films made of heat resistant plastics such as polyesters, polyamides or polyimides, which films may also be metal coated.

The inert support may additionally be coated on the side facing the thermal printing head with a lubricant in order that adhesion of the thermal printing head to the support material may be prevented. Suitable lubricants are for example silicones or polyurethanes as described in EP-A-216,483.

The thickness of the dye transfer is in general from 3 to 30 μm, preferably from 5 to 10 μm.

The substrate to be printed, e.g. paper, must in turn be coated with a plastic which receives the dye during the printing process. It is preferable to use for this purpose polymeric materials whose glass transition temperatures $T_g$ are within the range from 50° to 100° C.: e.g. polycarbonates and polyesters. Details may be found in EP-A-227,094, EP-A-133,012, EP-A-133,011, JP-A-199,997/1986 or JP-A-283,595/1986.

The process according to the present invention is carried out using a thermal printing head which is heatable to above 300° C., so thai dye transfer takes not more than 15 msec.

EXAMPLES

First, transfer sheets (donors) were produced from a polyester sheet from 6 to 10 μm in thickness coated with an approximately 5 μm thick transfer layer of a binder B which in each case contained about 0.25 g of azo dye I. The weight ratio of binder to dye was in each case 4:1, unless otherwise stated in the Tables below.

The substrate (receiver) to be printed was paper about 120 μm in thickness which had been coated with a layer of plastic 8 μm in thickness (Hitachi Color Video Print Paper).

Donor and receiver were placed on top of one another with the coated fronts next to each other, then wrapped in aluminum foil and heated between two hotplates at 70°–80° C. for 2 minutes. This operation was repeated three times with similar samples at a temperature within the range from 80° to 120° C., the temperature being increased each time.

The amount of dye diffusing into the plastics layer of the receiver in the course of transfer is proportional to the optical density determined photometrically as absorbance A after each heating phase at the abovementioned temperatures.

The plot of the logarithm of the measured absorbances A against the corresponding reciprocal of the absolute temperature is a straight line from whose slope it is possible to calculate the activation energy $\Delta E_\lambda$ for the transfer experiment:

$$\Delta E_T = 2.3 \cdot R \cdot \frac{\Delta \log A}{\Delta [1/T]} \quad R\text{: general gas constant}$$

From the plot it is additionally possible to discern the temperature T* at which the absorbance attains the value 1, i.e. at which the transmitted light intensity is one tenth of the incident light intensity. The lower the temperature T*, the better the thermal transferability of the particular dye.

The Tables which follow list the azo dyes I which were studied in respect of their thermal transfer characteristics together with their absorption maxima $\lambda_{max}$ [nm]. The $\lambda_{max}$ values were measured in methylene chloride or the stated solvent.

In addition, they list the particular binder B used employing the following abbreviations: EC=ethylcellulose, PVB=polyvinyl butyrate, MIX=EC:PVB=2:1, and VY=nylon.

If the abovementioned parameters R* [°C.] and ΔE, [kJ/mol] were measured, the values found are likewise stated.

TABLE 1
IIIa
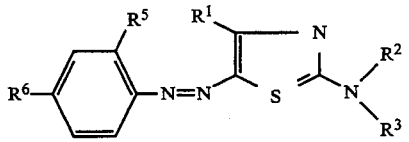
| Ex | $R^1$ | $R^2$ | $R^3$ | $R^5$ | $R^6$ | $\lambda_{max}$[nm] | B | T*[°C.] | $\Delta E_T$[kJ/mol] |
|---|---|---|---|---|---|---|---|---|---|
| 1 | —Ph | —$(CH_2)_2$—O—$CH_3$ | $R^2$ | —CN | —H | 494 | EC | 104 | 42 |
| 2 | —Ph | —$(CH_2)_2$—O—$CH_3$ | $R^2$ | 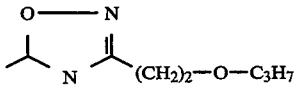 | —$NO_2$ | 544 | MS | 90 | 71 |
TABLE 2
IIIb
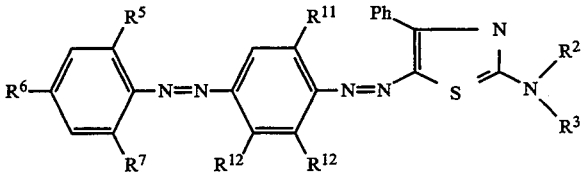
| Ex. | $R^2$ | $R^3$ | $R^5$ | $R^6$ | $R^7$ | $R^{11}$ | $R^{12}$ | $R^{12'}$ | $\lambda_{max}$[nm] | B | T*[°C.] | $\Delta E_T$[kJ/mol] |
|---|---|---|---|---|---|---|---|---|---|---|---|---|
| 3 | —$C_2H_5$ | $R^2$ | —Cl | —CN | —Cl | —O—$CH_3$ | —H | O—$CH_3$ | 584 | EC | 96 | 84 |
| 4 | —$(CH_2)_2$—O—$CH_3$ | $R^2$ | —H | —H | —H | —Br | —H | —H | 538 | MS | 97 | 76 |
| 5 | —$(CH_2)_2$—O—$CH_3$ | $R^2$ | —H | —H | —H | —Br | —Br | —H | 492 | EC | 106 | 84 |

TABLE 3

IIIc

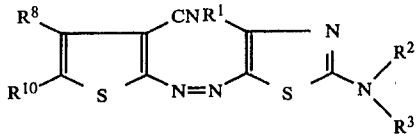

| Ex. | $R^1$ | $R^2$ | $R^3$ | $R^8$ | $R^{10}$ | $\lambda_{max}$[nm] | B | T*[°C.] | $\Delta E_T$[kJ/mol] |
|---|---|---|---|---|---|---|---|---|---|
| 6 | Cyclohexyl | $-C_2H_5$ | $R^2$ | $-CH_3$ | $-CN$ | 550 | MIX | 90 | 65 |
| 7 | Cyclohexyl | $-C_2H_5$ | $R^2$ | $-CH_3$ | $-CO-O-CH_3$ | 545[a] | — | — | — |
| 8 | Cyclohexyl | $-(CH_2)_2-O-CH_3$ | $R^2$ | $-CH_3$ | $-CO-O-CH_3$ | 544[a] | — | — | — |
| 9 | Cyclohexyl | $-(CH_2)_2-O-CH_3$ | $R^2$ | $-Cl$ | $-CO-H$ | 580[a] | MIX | 90 | 88 |
| | | | | | | | VY | 90 | 58 |
| 10 | Cyclohexyl | $-(CH_2)_2-O-CH_3$ | $R^2$ | $-Cl$ | $-CH=C(CN)-COO_4H_9$ | 625 | VY | 99 | 54 |
| 11 | Cyclohexyl | $-(CH_2)_2-O-CH_3$ | $-C_2H_5$ | $-CH_3$ | $-CN$ | 551 | MIX | 92 | 77 |
| 12 | Cyclohexyl | $-(CH_2)_2-O-CH_3$ | $-C_2H_5$ | $-Cl$ | $-CO-H$ | 572 | MIX | 92 | 66 |
| | | | | | | | VY | 86 | 40 |
| 13 | $-CH(CH_3)-CH_3$ | $-C_2H_5$ | $R^2$ | $-CH_3$ | $-CN$ | 547 | EC | 90 | 88 |
| 14 | $-CH(CH_3)-CH_3$ | $-C_2H_5$ | $R^2$ | $-Cl$ | $-CO-H$ | 572 | MIX | 90 | 50 |
| 15 | $-CH(CH_3)-CH_3$ | $-C_2H_5$ | $R^2$ | $-CH_3$ | $-CN$ | 547 | — | — | — |
| 16 | $-CH(CH_3)-CH_3$ | $-C_2H_5$ | $R^2$ | $-CO-O-C_2H_5$ | $-CO-O-C_2H_5$ | 542 | VY | 135 | 50 |
| 17 | $-CH(C_2H_5)-C_4H_9$ | $-C_2H_5$ | $R^2$ | $-Cl$ | $-CH=C(CN)-COOC_4H_9$ | 608 | MIX | 90** | 59 |
| 18 | $-Ph$ | $-C_2H_5$ | $R^2$ | $-H$ | $-NO_2$ | 623 | — | — | — |
| 19 | $-Ph$ | $-C_2H_5$ | $R^2$ | $-Cl$ | $-Br$ | 559 | — | — | — |
| 20 | $-Ph$ | $-C_2H_5$ | $R^2$ | $-Cl$ | $-CO-H$ | 602 | — | — | — |
| 21 | $-Ph$ | $-C_2H_5$ | $R^2$ | $-CH_3$ | $-CO-O-C_2H_5$ | 569 | EC | 132 | 64 |
| 22 | $-Ph$ | $-C_2H_5$ | $R^2$ | $-O-C_2H_5$ | $-CO-H$ | 598 | — | — | — |
| 23 | $-Ph$ | $-C_2H_5$ | $R^2$ | $-CO-O-C_2H_5$ | $-CO-O-C_2H_5$ | 573 | VY | 100 | 52 |
| 24 | $-Ph$ | $-(CH_2)_3-O-CH_3$ | $-C_2H_5$ | $-Cl$ | $-CO-H$ | 574 | VY | 81 | 23 |
| 25 | $-Ph$ | $-(CH_2)_3-O-(CH_2)_2-O-CH_3$ | $-C_2H_5$ | $-CH_3$ | $-CO-O-CH_3$ | 576[a] | — | — | — |
| 26 | $-Ph$ | $-(CH_2)_3-O-(CH_2)_2-O-CH_3$ | $-C_2H_5$ | $-Cl$ | $-CO-H$ | 606[a] | — | — | — |
| 27 | $-Ph$ | $-(CH_2)_3-O-(CH_2)_2-O-CH_3$ | $-C_3H_7$ | $-CH_3$ | $-CN$ | 582[a] | MIX | 91 | 64 |
| 28 | $-Ph$ | $-(CH_2)_3-O-(CH_2)_2-O-CH_3$ | $-C_3H_7$ | $-Cl$ | $-CO-H$ | 633 | MIX | 91 | 60 |
| 29 | $-Ph$ | $-[(CH_2)_2-O]_2-C_2H_5$ | $-(CH_2)_3-O-CH_3$ | $-Cl$ | $-CH=C(CN)-COOC_4H_9$ | 644 | EC | 130 | 76 |
| 30 | $-Ph$ | $-[(CH_2)_2-O]_2-C_2H_5$ | $-C_2H_5$ | $-Cl$ | $-CO-H$ | 601 | EC* | 94 | 73 |
| 31 | $-Ph$ | $-[(CH_2)_2-O]_2-C_2H_5$ | $-C_2H_5$ | $-Cl$ | $-CH=C(CN)-COOC_4H_9$ | 653 | MIX | 106 | 46 |
| 32 | $-Ph$ | $-[(CH_2)_2-O]_2-C_2H_5$ | $-(CH_2)_3-O-CH_3$ | $-Cl$ | $-CH=C(CN)-COOC_4H_9$ | 648 | MIX | 122 | 67 |
| 33 | $-Ph$ | $-(CH_2)_2-O-[(CH_2)_2-O]_2-CH_3$ | $-C_2H_5$ | $-CH_3$ | $-CN$ | 581[a] | — | — | — |
| 34 | $-Ph$ | $-(CH_2)_2-O-[(CH_2)_2-O]_2-CH_3$ | $-C_2H_5$ | $-CH_3$ | $-CN$ | 583[a] | — | — | — |
| 35 | $-Ph$ | $-CH_2-[(CH_2)_2-O]_2-CH_3$ | $-C_2H_5$ | $-CH_3$ | $-CO-O-C_2H_5$ | 575[a] | — | — | — |
| 36 | $-Ph$ | $-CH_2-[(CH_2)_2-O]_2-CH_3$ | $-C_2H_5$ | $-CH_3$ | $-CO-O-CH_3$ | 575[a] | — | — | — |
| 37 | $-Ph$ | $-CH_2-[(CH_2)_2-O]_2-C_2H_5$ | $-C_2H_5$ | $-CH_3$ | $-CO-O-C_2H_5$ | 575[a] | — | — | — |
| 38 | $-Ph-4-O-CH_3$ | $-C_2H_5$ | $R^2$ | $-CO-O-C_2H_5$ | $-CO-O-C_2H_5$ | 591 | EC | 120 | 50 |
| 39 | $-Ph-3-SO_2-N(CH_3)_2$ | $-C_2H_5$ | $R^2$ | $-Cl$ | $-CO-H$ | 595 | — | — | — |
| 40 | $-Ph-3-SO_2-N(CH_3)_2$ | $-(CH_2)_2-O-CH_3$ | $R^2$ | $-Cl$ | $-CO-H$ | 596 | — | — | — |
| 41 | $-Ph-3-SO_2-N[(CH_2)_2-O-CH_3]_2$ | $-C_2H_5$ | $R^2$ | $-CH_3$ | $-CO-O-CH_3$ | 586 | — | — | — |
| 42 | $-CH_2-Ph$ | $-(CH_2)_2-O-CH_3$ | $R^2$ | $-CH_3$ | $-CO-O-CH_3$ | 540[a] | VY | 94 | 51 |
| 43 | $-CH_2-O-Ph$ | $-C_2H_5$ | $R^2$ | $-CH_3$ | $-CN$ | 543[a] | MIX | 88 | 72 |
| 44 | Thien-3-yl | $-C_2H_5$ | $R^2$ | $-CH_3$ | $-CO-O-CH_3$ | 582[a] | — | — | — |
| 45 | Thien-2-yl | $-C_2H_5$ | $R^2$ | $-CO-O-C_4H_9$ | $-CO-O-C_4H_9$ | 600 | MIX | 94 | 80 |
| 46 | Thien-2-yl | $-(CH_2)_2-O-CH_3$ | $-C_2H_5$ | $-CH_3$ | $-CO-O-C_2H_5$ | 597[a] | — | — | — |

TABLE 3-continued

IIIc

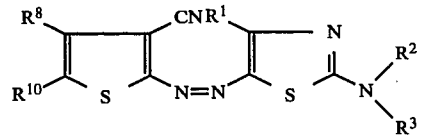

| Ex. | $R^1$ | $R^2$ | $R^3$ | $R^8$ | $R^{10}$ | $\lambda_{max}$[nm] | B | T*[°C.] | $\Delta E_T$[kJ/mol] |
|---|---|---|---|---|---|---|---|---|---|
| 47 | Thien-2-yl | $-(CH_2)_2-O-CH_3$ | $R^2$ | $-CH_3$ | $-CN$ | 599 | — | — | — |
| 48 | Thien-2-yl | $-(CH_2)_2-O-CH_3$ | $R^2$ | $-CH_3$ | $-CO-O-CH_3$ | 589 | — | — | — |
| 49 | Thien-2-yl | $-(CH_2)_2-O-CH_3$ | $R^2$ | $-Cl$ | $-CO-H$ | 631 | — | — | — |
| 50 | Thien-3-yl | $-(CH_2)_3-O-CH_3$ | $-C_2H_5$ | $-CH_3$ | $-CO-O-CH_3$ | 583[a] | — | — | — |
| 51 | Thien-2-yl | $-(CH_2)_3-O-CH_3$ | $-C_2H_5$ | $-CH_3$ | $-CO-O-C_2H_5$ | 598[a] | — | — | — |
| 52 | Thien-2-yl | $-(CH_2)_3-O-CH_3$ | $-C_2H_5$ | $-Cl$ | $-CO-H$ | 638[a] | — | — | — |
| 53 | Thien-2-yl | $-(CH_2)_2-O-(CH_2)$hd 2$-O-CH_3$ | $-C_2H_5$ | $-CH_3$ | $-CO-O-CH_3$ | 599[a] | — | — | — |
| 54 | Thien-2-yl | $-(CH_2)_2-O-(CH_2)$hd 2$-O-CH_3$ | $-C_2H_5$ | $-Cl$ | $-CO-O-H$ | 639[a] | — | — | — |
| 55 | Thien-2-yl | $-(CH_2)_2-O-(CH_2)$hd 2$-O-CH_3$ | $-C_3H_7$ | $-Cl$ | $-CO-O-H$ | 636 | MIX | 91 | 59 |
| 56 | Thien-3-yl | $-(CH_2)_2-O-(CH_2)$hd 2$-O-CH_3$ | $-C_3H_7$ | $-Cl$ | $-CO-O-H$ | 619[a] | — | — | — |
| 57 | Furan-2-yl | $-C_2H_5$ | $R^2$ | $-CH_3$ | $-CN$ | 605[a] | — | — | — |
| 58 | Furan-2-yl | $-C_2H_5$ | $R^2$ | $-CH_3$ | $-CO-O-CH_3$ | 596[a] | — | — | — |
| 59 | Furan-2-yl | $-(CH_2)_2-O-CH_3$ | $R^2$ | $-CH_3$ | $-CO-O-CH_3$ | 594[a] | — | — | — |
| 60 | Furan-2-yl | $-(CH_2)_3-O-(CH_2)_2-O-CH_3$ | $-C_3H_7$ | $-Cl$ | $-CO-H$ | 635[a] | — | — | — |
| 61 | Pyrid-3-yl | $-C_2H_5$ | $R^2$ | $-Cl$ | $-CO-H$ | 599[a] | — | — | — |

[a]solvent 9:1 dimethylformamide/glacial acetic acid
*weight ratio of binder:dye - 2:1

TABLE 3a

IIIc

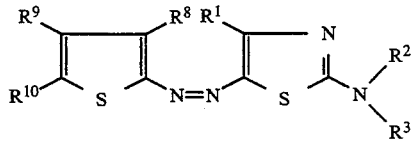

| Ex. | $R^1$ | $R^2$ | $R^3$ | $R^8$ | $R^9$ | $R^{10}$ | $\lambda_{max}$ [nm] | B | T* °C.] | $\Delta E_T$ [kJ/mol] |
|---|---|---|---|---|---|---|---|---|---|---|
| 62 | —Ph | —$CH_2$—[$(CH_2)_2$—O]$_2$—$CH_3$ | —$C_2H_5$ | —Cl | —CO—O—$CH_3$ | —CO—H | 598[a] | — | — | — |
| 63 | Thien-2-yl | —$(CH_2)_3$—O—$CH_3$ | —$C_2H_5$ | —$CH_3$ | —CO—O—$CH_3$ | —CN | 577 | VY | 82 | 32 |
| 64 | Thien-2-yl | —$(CH_2)_3$—O—$CH_3$ | —$C_2H_5$ | —Cl | —CO—O—$CH_3$ | —CO—H | 611[a] | — | — | — |
| 65 | —Ph | —$(CH_2)_3$—O—$CH_3$ | $R^2$ | —$CH_3$ | —CO—O—$C_2H_5$ | —CN | 562[a] | — | — | — |
| 66 | —Ph | —$(CH_2)_3$—O—$CH_3$ | —$C_3H_7$ | —$CH_3$ | —CO—O—$C_2H_5$ | —CN | 589[a] | — | — | — |
| 67 | —Ph-4-O—$CH_3$ | —$(CH_2)_3$—O—$CH_3$ | $R^2$ | —$CH_3$ | —CO—O—$C_2H_5$ | —CN | 567 | VY | 107 | 59 |
| 68 | Thien-2-yl | —$CH_2$—[$(CH_2)_2$—O]$_2$—$CH_3$ | —$C_2H_5$ | —$CH_3$ | —CO—O—$C_2H_5$ | —CN | 577 | VY | 105 | 45 |

[a]solvent 9:1 dimethylformamide/glacial acetic acid

TABLE 4

IIIe

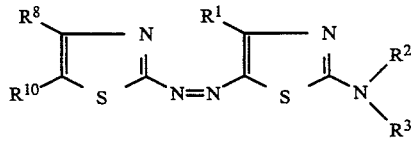

| Ex. | $R^1$ | $R^2$ | $R^3$ | $R^8$ | $R^{10}$ | $\lambda_{max}$ [nm] | B | T* [°C.] | $\Delta E_T$ [kJ/mol] |
|---|---|---|---|---|---|---|---|---|---|
| 69 | —Ph | —$(CH_2)_2$—$CH_3$ | $R^2$ | —H | —$NO_2$ | 595[a] | — | — | — |
| 70 | —Ph | —$(CH_2)_2$—$CH_3$ | $R^2$ | —Cl | —CO—H | 581 | — | — | — |
| 71 | —Ph | —$(CH_2)_2$—$CH_3$ | $R^2$ | —Cl | —CH=C(CN)—$COOC_4H_9$ | 637 | VY | 130 | 52 |
| 72 | Thien-3-yl | —$C_2H_5$ | $R^2$ | —Cl | —CH=C(CN)—$COOC_4H_9$ | 631 | VY | 125 | 67 |
| 73 | Thien-2-yl | —$C_2H_5$ | $R^2$ | —CO—O—$CH_3$ | —CN | 581 | — | — | — |
| 74 | Thien-2-yl | —$(CH_2)_2$—O—$CH_3$ | $R^2$ | —H | —$NO_2$ | 626 | — | — | — |
| 75 | Thien-3-yl | —$(CH_2)_3$—O—$(CH_2)_2$—O—$CH_3$ | —$C_3H_7$ | —Cl | —CO—H | 593 | — | — | — |

[a]solvent 9:1 dimethylformamide/glacial acetic acid

TABLE 5

IIIg

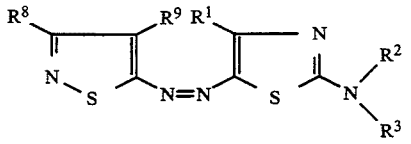

| Ex. | $R^1$ | $R^2$ | $R^3$ | $R^8$ | $R^9$ | $\lambda_{max}$ [nm] | B | T* [°C.] | $\Delta E_T$ [kJ/mol] |
|---|---|---|---|---|---|---|---|---|---|
| 76 | —CH($CH_3$)—$CH_3$ | —$C_2H_5$ | $R^2$ | —$(CH_2)_2$—O—$CH_3$ | —CN | 522 | EC* | 63 | 69 |
| 77 | Cyclohexyl | —$C_2H_5$ | $R^2$ | —$CH_3$ | —CN | 520 | MIX | 85 | 97 |
| | | | | | | 526[a] | VY | 75 | 34 |
| 78 | Cyclohexyl | —$C_2H_5$ | $R^2$ | —Ph | —CN | 529 | VY | 89 | 24 |
| 79 | Cyclohexyl | —$C_2H_5$ | $R^2$ | —$(CH_2)_2$—O—$CH_3$ | —CN | 528[a] | — | — | — |
| 80 | Cyclohexyl | —$(CH_2)_2$—O—$CH_3$ | $R^2$ | —$CH_3$ | —CN | 521 | VY | 75 | 42 |
| 81 | Cyclohexyl | —$(CH_2)_2$—O—$CH_3$ | $R^2$ | —Ph | —CN | 524 | MIX | 100 | 80 |
| 82 | Cyclohexyl | —$(CH_2)_3$—O—$CH_3$ | —$C_2H_5$ | —$CH_3$ | —CN | 523 | VY | 72 | 38 |
| 83 | Cyclohexyl | —$(CH_2)_3$—O—$CH_3$ | —$C_2H_5$ | —$C_2H_5$ | —CN | 520 | VY | 75 | 37 |
| 84 | Cyclohexyl | —$(CH_2)_3$—O—$CH_3$ | —$C_2H_5$ | —Ph | —CN | 529 | VY | 84 | 44 |
| 85 | Cyclohexyl | —$(CH_2)_3$—O—$CH_3$ | —$C_2H_5$ | —$(CH_2)_2$—O—$CH_3$ | —CN | 524 | VY | 72 | 33 |
| 86 | Cyclohexyl | —[$(CH_2)_2$—O]$_2$—$CH_3$ | $R^2$ | Thien-2-yl | —CN | 587[a] | — | — | — |
| 87 | Cyclohexyl | —$CH_2$—[$(CH_2)_2$—O]$_2$—$CH_3$ | —$C_3H_7$ | —Ph | —CN | 531 | VY | 88 | 38 |
| 88 | —Ph | —$C_2H_5$ | $R^2$ | —$(CH_2)_2$—O—$CH_3$ | —CN | 548 | VY | 89 | 53 |
| 89 | —Ph | —$C_2H_5$ | $R^2$ | —Ph-4-S—Ph | —CN | 556 | EC | 118 | 53 |
| 90 | —Ph-3-O—$CH_3$ | —$C_2H_5$ | $R^2$ | Thien-2-yl | —CN | 572 | — | — | — |
| 91 | —Ph-3-$SO_2$—N($CH_3$)$_2$ | —$(CH_2)_2$—O—$CH_3$ | $R^2$ | —$(CH_2)_3$—O—$CH_3$ | —CN | 548 | EC* | 89 | 32 |
| 92 | —$CH_2$—O—Ph | —$(CH_2)_2$—O—$CH_3$ | $R^2$ | —$CH_3$ | —CN | 531[a] | — | — | — |
| 93 | Furan-2-yl | —$C_2H_5$ | $R^2$ | —$CH_3$ | —CN | 578[a] | — | — | — |
| 94 | Furan-2-yl | —$C_2H_5$ | $R^2$ | —$(CH_2)_2$—O—$CH_3$ | —CN | 578[a] | — | — | — |

TABLE 5-continued

IIIg

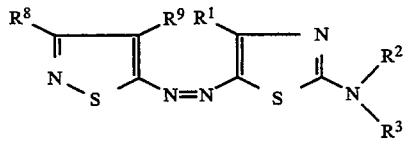

| Ex. | $R^1$ | $R^2$ | $R^3$ | $R^8$ | $R^9$ | $\lambda_{max}$ [nm] | B | T* [°C.] | $\Delta E_T$ [kJ/mol] |
|---|---|---|---|---|---|---|---|---|---|
| 95 | Thien-2-yl | $-(CH_2)_2-O-CH_3$ | $-C_2H_5$ | $-CH(CH_3)-CH_3$ | $-CN$ | 579[a] | — | — | — |
| 96 | Thien-2-yl | $-(CH_2)_3-O-CH_3$ | $-C_2H_5$ | $-C_2H_5$ | $-CN$ | 581[a] | — | — | — |
| 97 | Thien-2-yl | $-(CH_2)_3-O-CH_3$ | $-C_3H_7$ | $-C_2H_5$ | $-CN$ | 581[a] | — | — | — |
| 98 | Thien-3-yl | $-(CH_2)_3-O-(CH_2)_2-O-CH_3$ | $-C_2H_5$ | $-CH_3$ | $-CN$ | 562[a] | — | — | — |
| 99 | Thien-2-yl | $-CH_2-[(CH_2)_2-O]_2-CH_3$ | $-C_2H_5$ | $-C_2H_5$ | $-CN$ | 582[a] | — | — | — |
| 100 | Thien-2-yl | $-CH_2-[CH_2)_2-O]_2-CH_3$ | $-C_3H_7$ | $-C_2H_5$ | $-CN$ | 580[a] | — | — | — |
| 101 | $-CH(CH_3)-CH_3$ | $-C_2H_5$ | $R^2$ | $-CH_3$ | $-SCN$ | 512 | EC | 87 | 99 |
| 102 | $-Ph$ | $-C_2H_5$ | $R^2$ | $-CH_3$ | $-SCN$ | 540 | — | — | — |
| 103 | $-Ph$ | $-(CH_2)_2-O-CH_3$ | $R^2$ | $-CH_3$ | $-SCN$ | 538 | EC | 90 | 57 |
| 104 | -Thien-2-yl | $-C_2H_5$ | $R^2$ | $-CH_3$ | $-SCN$ | 562 | EC | 88 | 47 |

[a]solvent 9:1 dimethylformamide/glacial acetic acid
*weight ratio of binder:dye = 2:1

TABLE 6

IIIh

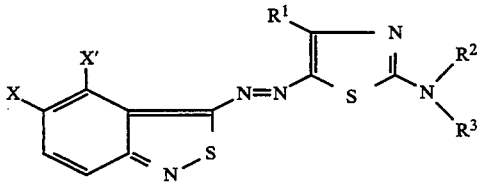

| Ex. | $R^1$ | $R^2$ | $R^3$ | X | X' | $\lambda_{max}$[nm] |
|---|---|---|---|---|---|---|
| 105 | $-Ph$ | $-(CH_2)_2-O-CH_3$ | $R^2$ | $-H$ | $-H$ | 573[a] |
| 106 | $-Ph$ | $-(CH_2)_2-O-CH_3$ | $R^2$ | $-Cl$ | $-H$ | 579[a] |
| 107 | $-Ph$ | $-(CH_2)_3-O-(CH_2)_2-O-CH_3$ | $-C_2H_5$ | $-H$ | $-H$ | 574[a] |
| 108 | $-Ph$ | $-(CH_2)_3-O-(CH_2)_2-O-CH_3$ | $-C_3H_7$ | $-NO_2$ | $-H$ | 629[a] |
| 109 | $-Ph$-4-$O-CH_3$ | $-(CH_2)_2-O-CH_3$ | $R^2$ | $-Cl$ | $-N$ | 594[a] |
| 110 | Thien-2-yl | $-(CH_2)_2-O-CH_3$ | $R^2$ | $-H$ | $-H$ | 594[a] |
| 111 | Thien-2-yl | $-(CH_2)_2-O-CH_3$ | $R^2$ | $-Cl$ | $-H$ | 602[a] |
| 112 | Thien-2-yl | $-(CH_2)_3-O-CH_3$ | $-C_2H_5$ | $-H$ | $-H$ | 597[a] |
| 113 | Thien-2-yl | $-(CH_2)_3-O-CH_3$ | $-C_2H_5$ | $-Cl$ | $-H$ | 605[a] |
| 114 | Thien-2-yl | $-(CH_2)_3-O-CH_3$ | $R^2$ | $-Cl$ | $-H$ | 606[a] |
| 115 | Thien-2-yl | $-(CH_2)_3-O-(CH_2)_2-O-CH_3$ | $-C_2H_5$ | $-H$ | $-H$ | 598[a] |
| 116 | Thien-2-yl | $-(CH_2)_3-O-(CH_2)_2-O-CH_3$ | $-C_3H_7$ | $-Cl$ | $-H$ | 598[a] |
| 117 | Thien-2-yl | $-(CH_2)_3-O-(CH_2)_2-O-CH_3$ | $-C_3H_7$ | $-H$ | $-Cl$ | 606[a] |

[a]solvent 9:1 dimethylformamide/glacial acetic acid

TABLE 7

IIIi

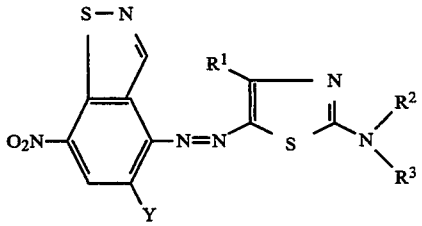

| Ex. | $R^1$ | $R^2$ | $R^3$ | Y | $\lambda_{max}$[nm] | B | T*[°C.] | $\Delta E_T$[kJ/mol] |
|---|---|---|---|---|---|---|---|---|
| 118 | $-CH_3$ | $-C_2H_5$ | $R^2$ | $-CN$ | 591 | EC* | 130 | 44 |
| 119 | $-Ph$ | $-C_2H_5$ | $R^2$ | $-H$ | 583 | — | — | — |
| 120 | $-Ph$ | $-(CH_2)_3-O-(CH_2)_2-O-CH_3$ | $-C_3H_7$ | $-CN$ | 622[a] | — | — | — |

[a]solvent 9:1 dimethylformamide glacial acetic acid
*weight ratio of binder:dye = 2.1

TABLE 8

IIIk

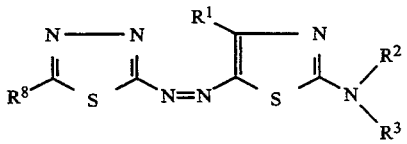

| Ex. | $R^1$ | $R^2$ | $R^3$ | $R^8$ | $\lambda_{max}$[nm] | B | T*[°C.] | $\Delta E_T$[kJ/mol] |
|---|---|---|---|---|---|---|---|---|
| 121 | —PH | $-C_2H_5$ | $R^2$ | —Ph | 531 | EC | 94 | 68 |
| 122 | —Ph | $-(CH_2)_2-O-CH_3$ | $R^2$ | —Ph | 533[a] | — | — | — |
| 123 | Cyclohexyl | $-(CH_2)_2-O-CH_3$ | $R^2$ | —Ph | 508[a] | — | — | — |
| 124 | Thien-2-yl | $-(CH_2)_2-O-CH_3$ | $R^2$ | —Ph | 556[a] | — | — | — |

[a]solvent 9:1 dimethylformamide/glacial acetic acid

TABLE 9

IIII

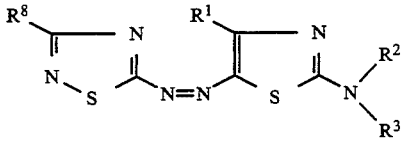

| Ex. | $R^1$ | $R^2$ | $R^3$ | $R^8$ | $\lambda_{max}$[nm] | B | T*[°C.] | $\Delta E_T$[kJ/mol] |
|---|---|---|---|---|---|---|---|---|
| 125 | —Ph | $-C_2H_5$ | $R^2$ | $-S-(CH_2)_2-CO-O-CH_3$ | 535 | EC | 110 | 72 |
| 126 | —Ph | $-C_2H_5$ | $R^2$ | $-S-(CH_2)_2-CN$ | 536 | EC | 103 | 47 |
| 127 | —Ph | $-C_2H_5$ | $R^2$ | $-S-CH_3$ | 533 | — | — | — |
| 128 | —Ph | $-C_2H_5$ | $R^2$ | $-CH_3$ | 524 | — | — | — |
| 129 | —Ph | $-(CH_2)_2-O-CH_3$ | $R^2$ | $-S-(CH_2)_2-CO-O-CH_3$ | 535 | MIX | 87 | 71 |
| 130 | Cyclohexyl | $-C_2H_5$ | $R^2$ | $-S-(CH_2)_2-CO-O-CH_3$ | 519[a] | — | — | — |
| 131 | Cyclohexyl | $-C_2H_5$ | $R^2$ | $-S-CH_3$ | 518[a] | — | — | — |
| 132 | Thien-2-yl | $-C_2H_5$ | $R^2$ | $-S-(CH_2)_2-CO-O-CH_3$ | 558 | VY | 93 | 61 |
| 133 | Thien-2-yl | $-C_2H_5$ | $R^2$ | $-S-(CH_2)_2-CN$ | 560 | EC | 105 | 42 |
| 134 | Thien-2-yl | $-C_2H_5$ | $R^2$ | $-S-CH_3$ | 557 | EC | 126 | 62 |

[a]solvent 9:1 dimethylformamide/glacial acetic acid
*weight ratio of binder:dye = 2:1

TABLE 10

IIIm

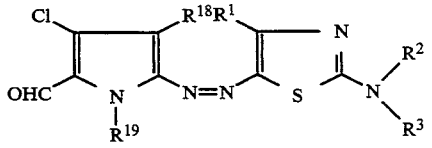

| Ex. | $R^1$ | $R^2$ | $R^3$ | $R^{18}$ | $R^{19}$ | $\lambda_{max}$[nm] | B | T*[°C.] | $\Delta E_T$[kJ/mol] |
|---|---|---|---|---|---|---|---|---|---|
| 135 | —Ph | $-C_2H_5$ | $R^2$ | —CN | —Ph | 567 | MIX | 106 | 37 |
| 136 | Thien-2-yl | $-C_2H_5$ | $R^2$ | $-CO-NH_2$ | $-CH_3$ | 573 | — | — | — |

TABLE 11

IIIg

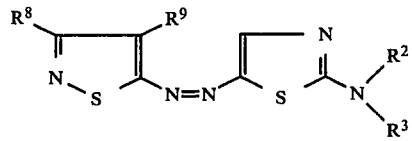

| Ex. | $R^1$ | $R^2$ | $R^3$ | $R^8$ | $R^9$ | Hue |
|---|---|---|---|---|---|---|
| 137 | —Ph | —$(CH_2)_2$—O—$CH_3$ | $R^2$ | —$CH_3$ | —H | red |
| 138 | —Ph | —$(CH_2)_2$—O—$CH_3$ | $R^2$ | —$CH_3$ | —Cl | red |
| 139 | —Ph | —$(CH_2)_2$—O—$CH_3$ | $R^2$ | —$CH_3$ | —Br | red |
| 140 | —Ph | —$(CH_2)_2$—O—$CH_3$ | $R^2$ | —$CH_3$ | —CN | violet |
| 141 | —Ph | —$(CH_2)_2$—O—$CH_3$ | $R^2$ | —$CH_3$ | —SCN | violet |
| 142 | —Ph | —$(CH_2)_2$—O—$CH_3$ | $R^2$ | —$C_2H_5$ | —CN | violet |
| 143 | —Ph | —$(CH_2)_2$—O—$CH_3$ | $R^2$ | —$CH(CH_3)$—$CH_3$ | —CN | violet |
| 144 | —Ph | —$(CH_2)_2$—O—$CH_3$ | $R^2$ | —$(CH_2)_2$—O—$C_2H_5$ | —CN | bluish red |
| 145 | —Ph | —$(CH_2)_2$—O—$CH_3$ | —$(CH_2)_2$—O—$CH_3$ | —$CH_3$ | —SCN | violet |
| 146 | —Ph | —$(CH_2)_2$—O—$CH_3$ | —$(CH_2)_2$—O—$CH_3$ | —Ph | —CN | violet |
| 147 | —Ph | —$(CH_2)_2$—O—$CH_3$ | —$(CH_2)_2$—O—$CH_3$ | —$(CH_2)_2$—O—$CH_3$ | —CN | violet |
| 148 | —Ph | —$(CH_2)_2$—O—$CH_3$ | —$C_2H_5$ | —$(CH_2)_2$—O—$CH_3$ | —CN | violet |
| 149 | —Ph | —$(CH_2)_3$—O—$C_2H_5$ | —$(CH_2)_2$—O—$CH_3$ | —$(CH_2)_2$—O—$CH_3$ | —CN | violet |
| 150 | —Ph | —$(CH_2)_3$—O—$C_2H_5$ | —$CH_3$ | —$(CH_2)_2$—O—$CH_3$ | —CN | violet |
| 151 | —Ph | —$(CH_2)_3$—O—$(CH_2)_2$—O—$CH_3$ | —$(CH_2)_2$—O—$CH_3$ | —Ph | —CN | violet |
| 152 | —Ph | —$(CH_2)_3$—O—$(CH_2)_2$—O—$CH_3$ | —$(CH_2)_3$—O—$CH_3$ | —Ph | —CN | violet |
| 153 | —Ph | —$[(CH_2)_2$—O$]_2$—$CH_3$ | —$(CH_2)_2$—O—$CH_3$ | —Ph | —CN | violet |
| 154 | —Ph | —$[(CH_2)_2$—O$]_2$—$CH_3$ | —$CH_3$ | —$(CH_2)_2$—O—$CH_3$ | —CN | violet |
| 155 | —Ph | —$[(CH_2)_2$—O$]_2$—$CH_3$ | —$C_2H_5$ | —$(CH_2)_2$—O—$CH_3$ | —CN | violet |
| 156 | —Ph | —$[(CH_2)_2$—O$]_2$—$C_2H_5$ | —$(CH_2)_3$—$CH_3$ | —$CH_3Ph$ | —CN | violet |
| 157 | —Ph | —$[(CH_2)_2$—O$]_2$—$CH_3$ | —$(CH_2)_3$—$CH_3$ | —Ph | —CN | violet |
| 158 | —Ph-4-Cl | —$(CH_2)_2$—O—$CH_3$ | $R^2$ | —$(CH_2)_2$—O—$CH_3$ | —CN | violet |
| 159 | —Ph-4-Cl | —$[(CH_2)_2$—O$]_2$—$CH_3$ | —$C_2H_5$ | —$(CH_2)_2$—O—$CH_3$ | —CN | violet |
| 160 | —Ph-4-O—$CH_3$ | —$(CH_2)_2$—O—$CH_3$ | —$C_2H_5$ | —$CH_3$ | —CN | violet |
| 161 | —Ph-4-O—$CH_3$ | —$(CH_2)_2$—O—$CH_3$ | —$C_2H_5$ | —$(CH_2)_2$—O—$CH_3$ | —CN | violet |
| 162 | Thien-2-yl | —$(CH_2)_2$—O—$CH_3$ | $R^2$ | —$CH_3$ | —SCN | violet |
| 163 | Thien-2-yl | —$(CH_2)_2$—O—$CH_3$ | $R^2$ | —$CH_3$ | —CN | reddish blue |
| 164 | Thien-2-yl | —$(CH_2)_2$—O—$CH_3$ | $R^2$ | —$C_2H_5$ | —CN | reddish blue |
| 165 | Thien-2-yl | —$(CH_2)_2$—O—$CH_3$ | $R^2$ | —$C_3H_7$ | —CN | reddish blue |
| 166 | Thien-2-yl | —$(CH_2)_2$—O—$CH_3$ | $R^2$ | —$CH(CH_3)$—$CH_3$ | —CN | reddish blue |
| 167 | Thien-2-yl | —$(CH_2)_3$—O—$CH_3$ | $R^2$ | —$(CH_2)_2$—O—$CH_3$ | —CN | navy |
| 168 | Thien-2-yl | —$(CH_2)_3$—O—$CH_3$ | $R^2$ | —$(CH_2)_2$—O—$C_2H_5$ | —CN | navy |
| 169 | Thien-2-yl | —$(CH_2)_3$—O—$CH_3$ | —$(CH_2)_2$—O—$CH_3$ | —$CH_3$ | —SCN | reddish blue |
| 170 | Thien-2-yl | —$(CH_2)_3$—O—$CH_3$ | —$(CH_2)_2$—O—$CH_3$ | —Ph | —CN | reddish blue |
| 171 | Thien-2-yl | —$(CH_2)_3$—O—$CH_3$ | —$(CH_2)_2$—O—$CH_3$ | —Ph | —SCN | reddish blue |
| 172 | Thien-2-yl | —$(CH_2)_3$—O—$CH_3$ | —$(CH_2)_2$—O—$CH_3$ | —$(CH_2)_2$—O—$CH_3$ | —CN | navy |
| 173 | Thien-2-yl | —$(CH_2)_3$—O—$CH_3$ | —$(CH_2)_2$—O—$CH_3$ | —$(CH_2)_2$—O—$C_2H_5$ | —CN | navy |
| 174 | Thien-2-yl | —$(CH_2)_3$—O—$CH_3$ | —$(CH_2)_2$—O—$C_2H_5$ | —$(CH_2)_2$—O—$CH_3$ | —CN | navy |
| 175 | Thien-2-yl | —$(CH_2)_3$—O—$CH_3$ | —$(CH_2)_2$—O—$C_2H_5$ | Thien-2-yl | —CN | blue |
| 176 | Thien-2-yl | —$(CH_2)_3$—O—$CH_3$ | —$C_2H_5$ | —$(CH_2)_2$—O—$CH_3$ | —CN | navy |
| 177 | Thien-2-yl | —$(CH_2)_3$—O—$C_2H_5$ | —$(CH_2)_3$—O—$CH_3$ | Thien-3-yl | —CN | blue |
| 178 | Thien-2-yl | —$(CH_2)_3$—O—$C_2H_5$ | —$(CH_2)_3$—O—$CH_3$ | —$(CH_2)_2$—O—$CH_3$ | —CN | navy |

TABLE 11-continued

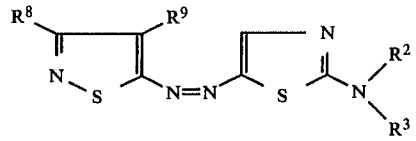

IIIg

| Ex. | $R^1$ | $R^2$ | $R^3$ | $R^8$ | $R^9$ | Hue |
|---|---|---|---|---|---|---|
| 179 | Thien-2-yl | $-(CH_2)_3-O-C_2H_5$ | $-(CH_2)_2-O-CH_3$ | 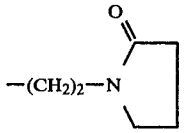 | $-CN$ | reddish blue |
| 180 | Thien-2-yl | $-(CH_2)_3-O-C_2H_5$ | $-(CH_2)_2-O-C_2H_5$ | $-(CH_2)_2-O-CH_3$ | $-CN$ | navy |
| 181 | Thien-2-yl | $-(CH_2)_3-O-(CH_2)_2-O-CH_3$ | $-C_2H_5$ | $-CH_3$ | $-SCN$ | bluish violet |
| 182 | Thien-2-yl | $-(CH_2)_3-O-(CH_2)_2-O-CH_3$ | $-C_2H_5$ | $-Ph$ | $-CN$ | reddish blue |
| 183 | Thien-2-yl | $-(CH_2)_3-O-(CH_2)_2-O-CH_3$ | $-C_2H_5$ | $-(CH_2)_2O-CH_3$ | $-CN$ | navy |
| 184 | Thien-2-yl | $-(CH_2)_3-O-(CH_2)_2-O-CH_3$ | $-C_2H_5$ | Thien-2-yl | $-CN$ | blue |
| 185 | Thien-2-yl | $-(CH_2)_3-O-(CH_2)_2-O-CH_3$ | $-C_3H_7$ | $-CH(CH_3)-CH_3$ | $-CN$ | navy |
| 186 | Thien-2-yl | $-(CH_2)_3-O-(CH_2)_2-O-CH_3$ | $-C_3H_7$ | $-Ph$ | $-CN$ | reddish blue |
| 187 | Thien-2-yl | $-(CH_2)_3-O-(CH_2)_2-O-CH_3$ | $-C_3H_7$ | $-(CH_2)_2-O-CH_3$ | $-CN$ | navy |
| 188 | Thien-2-yl | $-(CH_2)_3-O-(CH_2)_2-O-CH_3$ | $-C_3H_7$ | $-(CH_2)_2-O-C_2H_5$ | $-CN$ | navy |
| 189 | Thien-2-yl | $-(CH_2)_3-O-(CH_2)_2-O-C_2H_5$ | $-C_2H_5$ | $-(CH_2)_2-O-CH_3$ | $-CN$ | navy |
| 190 | Thien-2-yl | $-[(CH_2)_2-O]_2-CH_3$ | $-(CH_2)_2-O-CH_3$ | Thien-2-yl | $-CN$ | reddish blue |
| 191 | Thien-2-yl | $-[(CH_2)_2-O]_2-CH_3$ | $-(CH_2)_2-O-CH_3$ | Thien-3-yl | $-CN$ | blue |
| 192 | Thien-2-yl | $-[(CH_2)_2-O]_2-CH_3$ | $-(CH_2)_3-O-CH_3$ | $-Ph$ | $-CN$ | reddish blue |
| 193 | Thien-2-yl | $-[(CH_2)_2-O]_2-CH_3$ | $-C_2H_5$ | $-(CH_2)_2-O-CH_3$ | $-CN$ | navy |
| 194 | Thien-2-yl | $-[(CH_2)_2-O]_2-CH_3$ | $-C_2H_5$ | Thien-3-yl | $-CN$ | blue |
| 195 | Thien-2-yl | $-[(CH_2)_2-O]_2-CH_3$ | $-C_3H_7$ | $-(CH_2)_2-O-CH_3$ | $-CN$ | navy |
| 196 | Thien-2-yl | $-[(CH_2)_2-O]_2-C_2H_5$ | $-(CH_2)_3-O-CH_3$ | $-Ph$ | $-CN$ | reddish blue |
| 197 | Thien-2-yl | $-[(CH_2)_2-O]_2-C_2H_5$ | $-(CH_2)_3-O-CH_3$ | Pyrid-3-yl | $-CN$ | reddish blue |
| 198 | Thien-2-yl | $-[(CH_2)_2-O]_3-CH_3$ | $-(CH_2)_3-O-CH_3$ | $-Ph$ | $-CN$ | reddish blue |
| 199 | Thien-2-yl | $-[(CH_2)_2-O]_3-CH_3$ | $-(CH_2)_2-O-CH_3$ | Thien-2-yl | $-CN$ | reddish blue |
| 200 | Thien-2-yl | $-[(CH_2)_2-O]_3-CH_3$ | $-(CH_2)_2-O-CH_3$ | Thien-3-yl | $-CN$ | reddish blue |
| 201 | Thien-2-yl | $-[(CH_2)_2-O]_3-CH_3$ | $-C_2H_5$ | $-Ph$ | $-CN$ | reddish blue |
| 202 | Thien-2-yl | $-[(CH_2)_2-O]_3-CH_3$ | $-C_2H_5$ | Thien-2-yl | $-CN$ | blue |
| 203 | Thien-2-yl | $-[(CH_2)_2-O]_3-CH_3$ | $-C_2H_5$ | Thien-3-yl | $-CN$ | blue |

TABLE 12

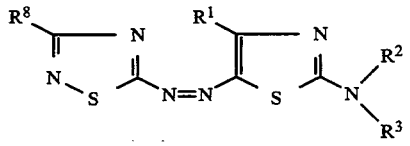

IIII

| Ex. | $R^1$ | $R^2$ | $R^3$ | $R^8$ | Hue |
|---|---|---|---|---|---|
| 204 | —Ph | —$(CH_2)_2$—O—$CH_3$ | $R^2$ | —S—$CH_3$ | reddish violet |
| 205 | —Ph | —$(CH_2)_3$—O—$CH_3$ | —$(CH_2)_2$—O—$CH_3$ | —S—$CH_3$ | violet |
| 206 | —Ph | —$(CH_2)_3$—O—$CH_3$ | —$C_2H_5$ | —S—$(CH_2)_2$—CO—O—$CH_3$ | violet |
| 207 | —Ph | —[$(CH_2)_2$—O]$_2$—$CH_3$ | Ph | —S—$CH_3$ | violet |
| 208 | —Ph | —[$(CH_2)_2$—O]$_2$—$C_2H_5$ | Ph | —S—$CH_3$ | violet |
| 209 | —Ph-4-O—$CH_3$ | —$(CH_2)_3$—O—$CH_3$ | —$(CH_2)_2$O—$CH_3$ | —S—$CH_3$ | violet |
| 210 | Thien-2-yl | —$(CH_2)_2$—O—$CH_3$ | $R^2$ | —S—$CH_3$ | reddish blue |
| 211 | Thien-2-yl | —$(CH_2)_3$—O—$CH_3$ | $R^2$ | —S—$CH_3$ | reddish blue |
| 212 | Thien-2-yl | —$(CH_2)_3$—O—$CH_3$ | —$(CH_2)_2$—O—$CH_3$ | —S—$C_2H_5$ | reddish blue |
| 213 | Thien-2-yl | —$(CH_2)_3$—O—$CH_3$ | —$(CH_2)_2$—O—$C_2H_5$ | —S—$CH_3$ | bluish violet |
| 214 | Thien-2-yl | —$(CH_2)_3$—O—$CH_3$ | —$C_2H_5$ | —S—$(CH_2)_2$—CO—O—$CH_3$ | bluish violet |
| 215 | Thien-2-yl | —$(CH_2)_3$—O—$C_2H_5$ | —$C_2H_5$ | —S—$(CH_2)_2$—CO—O—$CH_3$ | bluish violet |
| 216 | Thien-2-yl | —[$(CH_2)_2$—O]$_2$—$CH_3$ | —$C_2H_5$ | —S—$CH_3$ | bluish violet |
| 217 | Thien-2-yl | —[$(CH_2)_2$—O]$_2$—$C_2H_5$ | —$(CH_2)_3$—O—$CH_3$ | —S—$CH_3$ | bluish violet |
| 218 | Thien-2-yl | —[$(CH_2)_2$—O]$_2$—$C_2H_5$ | —$C_2H_5$ | —S—$CH_3$ | bluish violet |

We claim:

1. A process comprising printing a substrate by thermotransfer printing with a transfer dye which is an azo dye of the general formula I

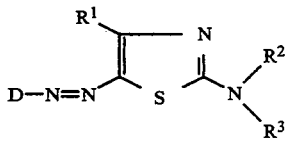

I in which the substituents have the following meanings:

$R^1$ is hydrogen;

$C_1$–$C_{15}$-alkyl, $C_1$–$C_{15}$-alkyl substituted by phenyl or phenoxy; cyclohexyl, cyclohexyl substituted by $C_1$–$C_5$-alkyl, $C_1$–$C_5$-alkoxy or halogen;

phenyl, phenyl substituted by $C_1$–$C_5$-alkyl, $C_1$–$C_5$-alkoxy, sulfonamido or halogen;

thienyl, thienyl substituted by $C_1$–$C_5$-alkyl or halogen; furanyl or pyridyl;

a radical of the formula II $$[—W—O]_n—R^4 \qquad II$$

where

W is identical or different $C_2$–$C_6$-alkylene, n is from 1 to 6 and $R^4$ is $C_1$–$C_4$-alkyl, phenyl or benzyl; phenyl or benzyl substituted by $C_1$–$C_4$-alkyl or $C_1$–$C_4$-alkoxy;

$R^2$ and $R^3$ are each hydrogen;

alkyl, alkoxy, alkoxyalkyl, alkanoyloxyalkyl, alkoxycarbonyloxyalkyl, alkoxycarbonylalkyl, haloalkyl, hydroxyalkyl or cyanoalkyl, each containing up to 15 carbon atoms;

alkyl, alkoxyalkyl, alkanoyloxyalkyl, alkoxycarbonyloxyalkyl, alkoxycarbonylalkyl, haloalkyl, hydroxyalkyl or cyanoalkyl, each containing up to 15 carbon atoms, substituted by phenyl, $C_1$–$C_4$-alkylphenyl, $C_1$–$C_4$-alkoxyphenyl, halophenyl, benxyloxy, $C_1$–$C_4$-alkylbenzyloxy, $C_1$–$C_4$-alkoxybenzyloxy, halogenzyloxy, halogen, hydroxyl or by cyano;

cyclohexyl, cyclohexyl substituted by $C_1$–$C_{15}$-alkyl, $C_1$–$C_{15}$-alkoxy or halogen;

phenyl, phenyl substituted by $C_1$–$C_{15}$-alkyl, $C_1$–$C_{15}$-alkoxy, benzyloxy or halogen;

a radical of the above-mentioned formula II; and

D is the radical of a diazo component III.

$$D—NH_2 \qquad III$$

*wherein D is the radical of a diazo component III of the aminothiophene, phenylazoaminothiophene, aminothiazole, phenylazoaminothiazole, aminoisothiazole, aminobenzisothiazole, aminothiadiazole, aminoisothiadiazole, aminooxazole, aminooxadiazole, aminodiazole, aminotriazole or aminopyrrole series.*

2. A process comprising transferring an azo dye or dyes by diffusiton from a transfer to a plastic-coated substrate by means of a thermal printing head, wherein said azo dye or dyes is or are of the formula I

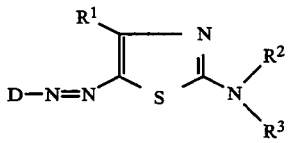

I in which the substituents have the following meanings:

$R^1$ on is hydrogen;

$C_1$–$C_{15}$-alkyl, $C_1$–$C_{15}$-alkyl substituted by phenyl or phenoxy; cyclohexyl, cyclohexyl substituted by $C_1$–$C_5$-alkyl, $C_1$–$C_5$-alkoxy or halogen;

phenyl, phenyl substituted by $C_1$–$C_5$-alkyl, $C_1$–$C_5$-alkoxy, sulfonamido or halogen;

thienyl, thienyl substituted by $C_1$–$C_5$-alkyl or halogen; furanyl or pyridyl;

a radical of the formula II $$[—W—O]_n—R^4 \qquad II$$

where

W is identical or different $C_2$–$C_6$-alkylene, n is from 1 to 6 and $R^4$ is $C_1$–$C_4$-alkyl, phenyl or benzyl; phenyl or benzyl substituted by $C_1$–$C_4$-alkyl or $C_1$–$C_4$-alkoxy;

$R^2$ and $R^3$ are each hydrogen;

alkyl, alkoxy, alkoxyalkyl, alkanoyloxyalkyl, alkoxycarbonyloxyalkyl, alkoxycarbonylalkyl, haloalkyl, hydroxyalkyl or cyanoalkyl, each containing up to 15 carbon atoms;

alkyl, alkoxy, alkoxyalkyl, alkanoyloxyalkyl, alkoxycarbonyloxyalkyl, alkoxycarbonylalkyl, haloalkyl, hydroxyalkyl or cyanoalkyl, each containing up to 15 carbon atoms, substituted by phenyl, $C_1$–$C_4$-alkylphenyl, $C_1$–$C_4$-alkoxyphenyl, halophenyl, benzyloxy, $C_1$–$C_4$-alkylbenzyloxy, $C_1$–$C_4$-alkoxybenzyloxy, halogenzyloxy, halogen, hydroxyl or by cyano;

cyclohexyl, cyclohexyl substituted by $C_1$–$C_{15}$-alkyl, $C_1$–$C_{15}$-alkoxy or halogen;

phenyl, phenyl substituted by $C_1$–$C_5$-alkyl, $C_1$–$C_5$-alkoxy, $C_1$–$C_{15}$-alkoxy, benzyloxy or halogen;

a radical of the above-mentioned formula II; and

D is the radical of a diazo component III $$D—NH_2 \qquad \text{III}$$

*wherein D is the radical of a diazo component III of the aminothiophene, phenylazominothiophene, aminothiazole, phenylazominothiazole, aminoisothiazole, aminobenzisothiazole, aminothiadiazole, aminoisothiadiazole, aminooxazole, aminooxadiazole, aminoidazole, aminotriazole or aminopyrrole series.*

3. A process as claimed is claim 2, wherein the azo dye or dyes has the formula Ia

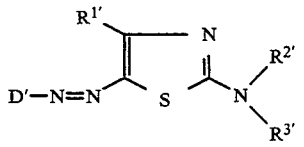

Ia where the substituents have the following meanings:

$R^1$ is $C_1$14 $C_8$-alkyl, $C_1$–$C_8$-alkyl substituted by phenyl or phenoxy;

cyclohexyl;

phenyl, phenyl substituted by $C_1$–$C_4$-alkyl, $C_1$–$C_4$-alkoxy or chlorine;

thienyl;

a radical of the formula IIa $$[—(CH_2)_3—O]_p—[(CH_2)_2—O]_q—R^4 \qquad \text{IIa}$$

where p is 0 or 1, q is from 1 to 4, and $R^{4'}$ is $C_1$–$C_4$-alkyl, phenyl or benzyl;

$R^{2'}$ and $R^{3'}$ are each $C_1$–$C_{12}$-alkyl, $C_1$–$C_{10}$-alkoxy or $C_1$–$C_{10}$-cyanoalklyl or a radical of the above-mentioned formula IIa; and D′ is the radical of a diazo component III of the [aniline, phenylazoaniline.] aminothiophene, phenylazoaminothiophene, aminothiazole, phenylazoaminothiazole, aminoisothiazole, aminobenzisothiazole, aminothiadiazle, aminooxadiazole, aminodiazole, aminotriazole or aminopyrrole series.

* * * * *